United States Patent [19]

Roggenbuck et al.

[11] Patent Number: 5,333,694
[45] Date of Patent: Aug. 2, 1994

[54] STRIP-TILL SEED BED PREPARATION APPARATUS

[76] Inventors: David C. Roggenbuck, 4595 Curry Rd.; Paul Roggenbuck, 575 Germania; Vincent Roggenbuck, 645 N. Germania Rd., all of Snover, Mich. 48472

[21] Appl. No.: 877,216

[22] Filed: May 1, 1992

[51] Int. Cl.$^5$ ............................. A01B 49/02; A01B 61/00
[52] U.S. Cl. ............................. 172/156; 172/166; 172/196; 172/510; 172/135; 172/266
[58] Field of Search ............. 172/134, 140, 156, 166, 172/180, 182, 144, 196, 201, 510, 551, 135, 145, 148, 149, 155, 201, 264, 265, 266, 699, 701; 111/123

[56] References Cited

U.S. PATENT DOCUMENTS

| | | | |
|---|---|---|---|
| 1,551,477 | 8/1925 | Fleming | 172/196 X |
| 2,250,075 | 7/1941 | Werb | 97/61 |
| 2,304,376 | 12/1942 | Ramsey | 97/53 |
| 3,202,222 | 8/1965 | Norris . | |
| 3,380,411 | 4/1968 | Orendorff | 111/63 |
| 3,967,564 | 7/1976 | Emling | 111/7 |
| 4,040,491 | 8/1977 | Dietrich | 172/699 X |
| 4,142,589 | 3/1979 | Schlagenhauf | 172/510 |
| 4,187,916 | 2/1980 | Harden et al. | 172/146 |
| 4,485,878 | 12/1984 | Uken | 172/156 X |
| 4,524,837 | 6/1985 | Harden | 172/156 |
| 4,548,276 | 10/1985 | Linger | 172/166 |
| 4,729,435 | 3/1988 | Urich | 172/196 |
| 4,865,132 | 9/1989 | Moore, Jr. | 172/196 |
| 5,082,064 | 1/1992 | Landoll et al. | 172/196 X |

OTHER PUBLICATIONS

Ro-Till brochure, Brown-Harden, 4 pages dated stamped Jan. 12, 1983.

*Primary Examiner*—Clifford D. Crowder
*Assistant Examiner*—Paul C. Lewis
*Attorney, Agent, or Firm*—John J. Swartz

[57] ABSTRACT

Seed bed preparation apparatus for the no-till preparation of longitudinal strips of soil for the planting of seeds in longitudinal rows including plurality of laterally spaced apart gang assemblies which are individually mounted on a draft vehicle such as a tractor or the like. Each gang assembly includes a main frame, adapted to the coupled to the draft vehicle, swingably mounting a chassis which follows the contour of the land via rotatable depth wheels which mount a forward, surface soil cutting disk for cutting a slot in the surface soil. A vertical tillage blade is received in the slot cut by the cutting wheel and includes an under surface soil lifting tillage point for lifting and partially breaking up strip of soil as the apparatus forwardly moves. A pair of rotatable soil crumbling disks are mounted on the chassis, parallel to the tillage blade, on opposite side of the blade for containing and further crumbling the portion of the lifted strip of soil between the disks and the blade.

36 Claims, 7 Drawing Sheets

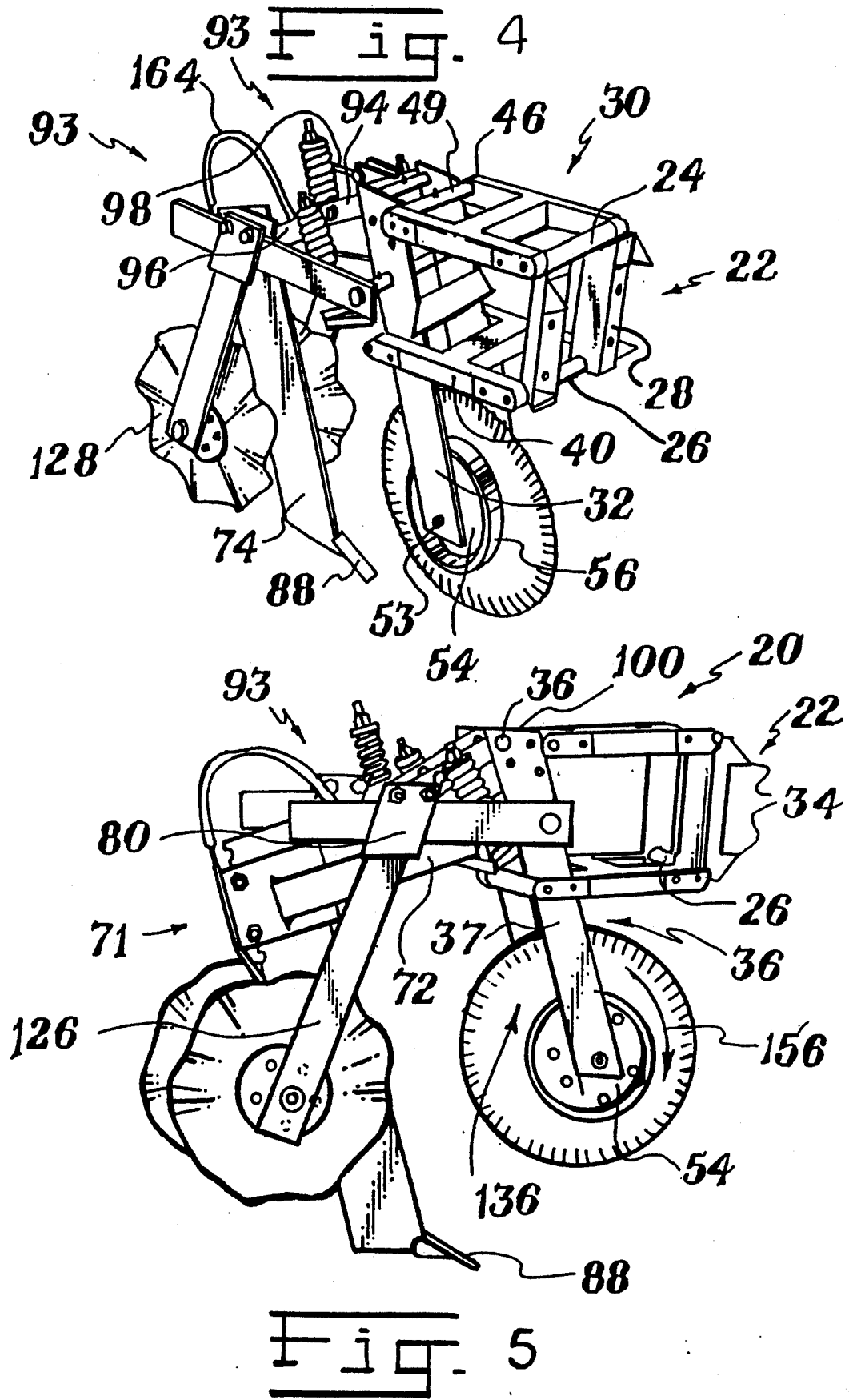

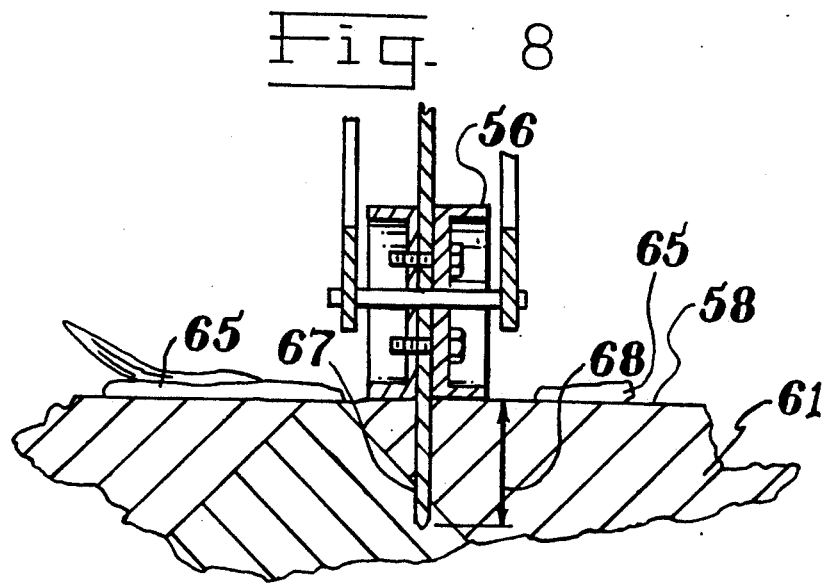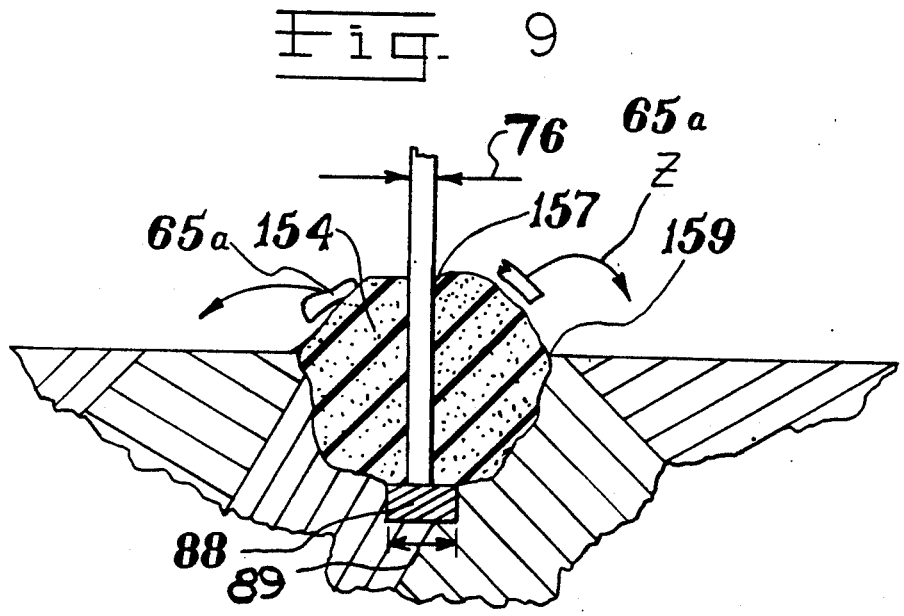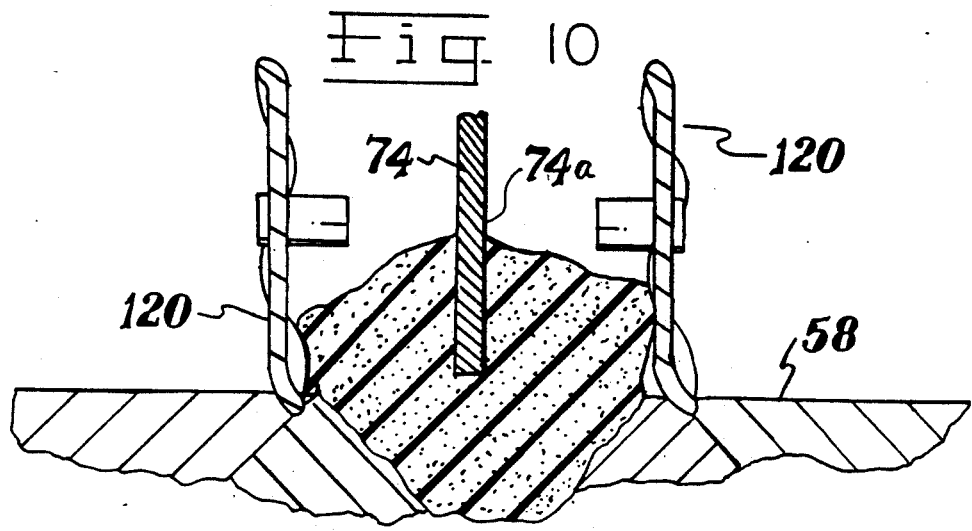

STRIP-TILL SEED BED PREPARATION APPARATUS

BACKGROUND OF THE INVENTION

1. Field of the Invention

This invention relates to seed bed preparation apparatus for preparing longitudinally spaced, rows of soil in a residue laden field for seeding and, more particularly, to strip-till, seed bed preparation apparatus which includes individually adjustable and controllable, laterally spaced apart, gang assemblies that can each be vertically adjusted to till, to the same depth, longitudinally extending, laterally spaced strips of soil at different elevations.

2. Description of the Prior Art and Objects

For many years, residue laden farm land was prepared for seeding by a plurality of different farm implements including plows which turn surface sod and residue laden surface soil into furrows; disks which thereafter cut the turned sod and residue; and harrows which further reduce and pulvarize the soil. These farm implements, although still utilized, have fallen into disfavor in many areas because of the errosion associated with the earlier farming implements and methods.

Rather than plow the soil with conventional plows, farmers now sometimes utilize so-called "no-till" tools which include ground penetrating bars that penetrate and break up, or shatter, the soil without turning it. Rather than tilling the entire field, such machines will till laterally spaced, longitudinally extending strips of soil where the seed will be planted in laterally spaced, longitudinally extending rows. This practice minimizes the disruption to the soil surface which is subject to erosion by wind and water. Such machines may include a rotatable disk for cutting the surface soil ahead of a soil penetrating blade which mounts a sub-surface, soil lifting tool.

Other farm implements have included so-called sub-soilers which break up "hard pan" at relatively deep depths. The apparatus constructed according to the present invention is provided for tilling strips of surface soil as opposed to hard pan sub-soil.

It has been found advantageous to provide seed bed preparation apparatus with a surface penetrating blade which lifts a strip of surface soil and rotatable disks which are mounted on laterally opposite sides of the ground penetrating blade. Such devices are illustrated in U.S. Pat. No. 4,524,837 issued to Jerrell W. Harden on Jun. 25, 1985 and U.S. Pat. No. 4,187,916 issued to Jerrell W. Harden on Feb. 12, 1980. Such devices, however, were mounted directly to a tool bar coupled to a draft vehicle. When the prior art machines are utilized to till land which is flat or level, this prior art apparatus operates acceptably, however, in fields which have unlevel, undulating terrain of different elevations, the prior art Harden devices are limited because of the inability to individually adjust and control the depth of tool penetration. Accordingly, it is an object of the present invention to provide new and novel strip-till seed bed preparation apparatus which is more readily adaptable to cultivating surfaces which have undulating terrain contours.

Another object of the present invention is to provide strip-till seed bed preparation apparatus of the type described which includes a plurality of laterally spaced apart gang assemblies for preparing a plurality of laterally spaced apart, longitudinal rows of seed beds in a field having an uneven surface contour.

Yet another object of the present invention is to provide strip-till seed bed preparation of the type described including a plurality of laterally spaced apart individually controllable gang assemblies, each including a chassis which is swingably mounted on a main frame and is vertically supported by depth wheels for following the contour of the surface being traversed.

It is a further object of the present invention to provide strip-till, seed bed preparation of the type described which includes a chassis that follows the contour of the land and includes sub-surface, soil lifting apparatus which is mounted on the chassis for vertical movement thereon to any selected one of a plurality of vertically spaced positions so that the depth of each gang assembly can be individually controlled relative to an adjacent gang assembly.

Farmers who apply for government provided commoditity benefits may be denied such benefits if they do not comply with Farm Acts which designate certain areas as highly errodable land. In these cases, 30 percent of any residue from prior crops must remain atop the soil after the seeding is completed. Such residue, of course, normally interferes with proper seeding if allowed to remain in the seed bed. Accordingly, it is an object of the present invention to provide seed bed preparation apparatus which will lift a strip of soil and laterally outwardly propel at least a portion of surface residue and dead plant material thereon.

It is an object of the present invention to provide strip-till seed bed preparation apparatus for tilling laterally spaced, longitudinal strips of soil for seeding including a main frame, a sub-frame swingably mounted on the main frame and supported by depth wheels which travel along the surface to cause the sub-frame to vertically follow and conform to the contour of the farm field surface.

It is another object of the present invention to provide strip-till seed bed preparation apparatus of the type described including a chassis, a ground penetrating tillage blade swingably mounted at one end on the chassis, and yieldable reset mechanism including toggle links coupling another portion of the ground penetrating blade to the chassis for yieldably urging the blade to a forward operating position but allowing the blade to move to a tripped, inoperative position upon striking an obstruction such as a rock or the like.

Another object of the present invention is to provide strip-till seed bed preparation apparatus of the type described including a tillage knife which enters the ground to lift a strip of surface soil as the machine moves forwardly and a pair of parallel coulters which are mounted on opposite sides of the tillage knife for laterally arresting a portion of the raised strip of soil adjacent the knife and holding it against opposite sides of the blade to pulvarize the soil and form a longitudinal seed bed row.

Still another of the present invention is to provide strip-till seed bed preparation apparatus of the type described which will leave a substantial amount of residue at the surface and till a plurality of longitudinal strips of surface soil having different, undulating contours.

Another object of the present invention is to provide strip-till seed bed preparation apparatus of the type described which will rearwardly, upwardly swing upon striking an obstruction, such as an underground rock, and then automatically reset when the obstruction is cleared.

The prior art devices also utilize soil lifting points mounted on the lower ends of a shank which is relatively wide and of a parabolic shape which tapers in width from top to bottom to assist in pushing soil sidewise to create a slot. Such devices require a draft vehicle with substantial pulling power.

Another object of the present invention is to provide strip-till seed bed preparation apparatus of the type described including a sub-surface, soil lifting point mounted on a thin, flat tillage blade which cuts through the soil with a minimum disruption of the soil surface and thus reduce the power required to till.

Other objects and advantages of the present invention will become apparent to those of ordinary skill in the art as the description thereof proceeds.

SUMMARY OF THE INVENTION

Seed bed preparation apparatus for preparing soil for planting of seeds in one or more parallel longitudinal rows comprising: a main frame; a chassis; mechanism for mounting the chassis on the main frame for forward movement therewith and for vertical swinging movement relative thereto; mechanism mounted on the chassis for supporting the chassis on the ground so that the chassis follows the contour of the earth being tilled; soil cutting and lifting mechanism mounted on the chassis including a vertical blade having an above-surface blade portion and an undersurface blade portion for entering the soil to a predetermined depth and lifting a strip of soil as the apparatus moves forwardly; and at least one rotatable disk being mounted on the chassis in laterally spaced, longitudinally overlapping relation with an above surface blade portion to laterally inwardly contain, work, and crumble a portion of the lifted soil strip between the disk and the surface blade portions to form a pulvarized row of planting soil.

DESCRIPTION OF THE DRAWINGS

The invention may be more readily understood by referring to the accompanying drawings, in which:

FIG. 4 is a front perspective view thereof;

FIG. 5 is a rear perspective view thereof from a slightly different angle than FIG. 3;

FIG. 8 is a vertical sectional view taken along the line 8—8 of FIG. 6 illustrating the slot cut in the soil surface by a forward rotatable coulter;

FIG. 9 is a vertical sectional view, taken along the line 9—9 of FIG. 6 illustrating a strip of soil in a partially elevated position by an underground tillage knife;

FIG. 10 is a vertical sectional view, taken along the line 10—10 of FIG. 6 illustrating the mounding of the strip of soil in a further elevated position between a tillage blade and a pair of coulter disks where the soil is held and pulverized as it passes between the blade and disks.

DESCRIPTION OF THE PREFERRED EMBODIMENT

Figure 1:
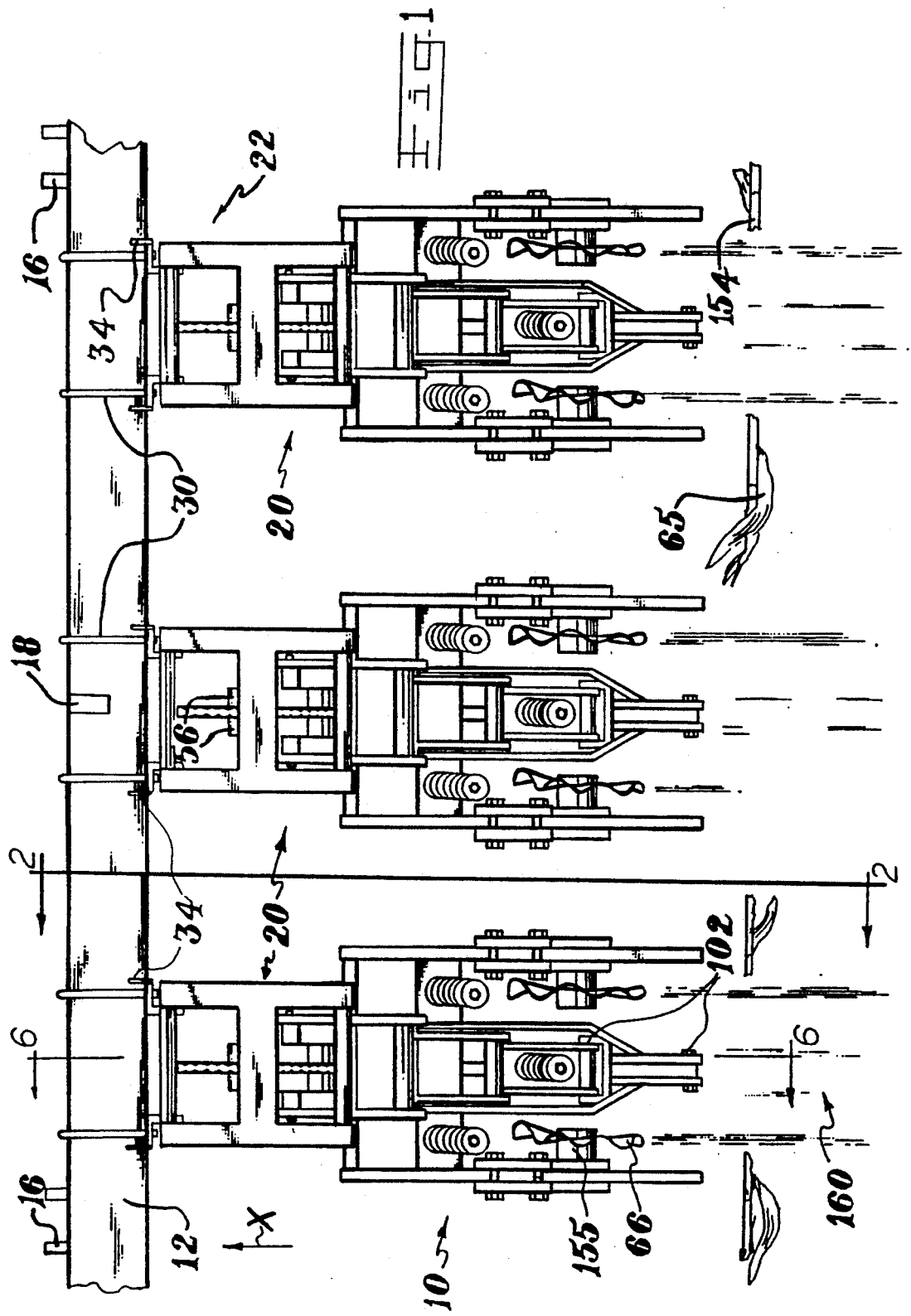
FIG. 1 is a top plan view of strip-till seed bed preparation apparatus constructed according to the present invention.

Strip-till, seed bed preparation apparatus constructed according to the present invention, generally designated 10, is mounted on an elongate, tubular tool bar 12 which is coupled to a conventional, hydraulically operated, three point draft tractor coupling (not shown) via a pair of laterally spaced front apertured plates 16 and a top apertured plate 18 provided on the tool bar 12.

The apparatus 10, constructed according to the present invention, comprises a plurality of identical, laterally spaced apart gang assemblies, generally designated 20, which are individually laterally and vertically adjustable relative to each of the other gang assemblies.

Each gang assembly 20 includes a main frame, generally designated 22, having a pair of horizontally spaced, vertical angle brackets 28 spanned by upper and lower bushings 24 and 26. The frame 22 is coupled to the tool bar 12 via laterally spaced apart U-bolts 30 which are received in apertures provided in the angle brackets 28. Locater ears 34 project forwardly from the angle brackets 28 for vertically aligning the assembly 20 on the tool bar 12. The vertically inclined chassis bars 37 are spanned by cross members 35.

A sub-frame or chassis, generally designated 36, includes a pair of laterally spaced, vertically inclined, chassis bars 37 swingably mounted on the main frame 22 via vertically spaced, upper and lower, parallel H-frames, generally designated 38 and 40. The forward end 39 of the upper H-frame 38 is pivotally or swingably mounted on the main frame 22 via a pivot pin 42 which is received by the upper bushing 24. The front end 41 of the lower parallel H-frame 40 is pivotally or swingably coupled to a vertically spaced portion of main frame 22 via a pivot pin 44 which is rotatably received by bushing 26. The rear end 46 of upper H-frame 38 is pivotally coupled to the chassis 36 via pivot pin 48 rotatably received in a bushing 49 spanning the chassis bars 37. The rear end 50 of bottom H-frame 40 is coupled to the chassis 36 via a pivot pin 52 spanning the chassis bars 37. The chassis bars 37 are forwardly downwardly inclined at an angle 55 approximately 20° to the vertical.

Rotatably mounted on an axle or spindle 53 spanning chassis bars 37 at the lower end of chassis 36 is a hub 54 mounting a pair of depth band wheels 56 which engage the upper field surface 58 of the soil 60 to be tilled whereby the chassis 36 will follow the longitudinally and laterally undulating contour of the soil surface 58. As the depth band wheel 56 negotiate surface undulations schematically illustrated at 64, the chassis 36 will drop.

The earth surface is frequently laden with plant residue such as roots, prior vegetation, or harvested crop such as corn stalks designated 65 (FIGS. 1 and 8). Affixed to the hub 54 is a generally planar, front vertical coulter disk 66 which severs the residue 65 and cuts a slot or groove 67 in the residue laden soil surface 61 to a predetermined depth 68. The slot or groove 67 cut in the surface soil 61 reduces the horsepower otherwise required to forwardly move the machine.

The front coulter wheel or disk 66 is generally planar and comprises a flat vertical disk having a slightly rippled peripheral edge portion 63.

Swingably mounted on the chassis 36 via a pivot pin or spindle 70, spanning chassis bars 37, is a tillage knife assembly, generally designated 71. The tillage knife assembly 71 includes a rearwardly extending mounting bar 72, having a front end 73 pivotally mounted on the spindle 70. The rearward end 73a of mounting bar 72 mounts a downwardly forwardly extending tillage blade or shank 74. The tillage blade 74 comprises a generally flat metal bar having a uniform lateral thickness or width 76 which is substantially less than the front-to-rear depth 78 of the tillage blade 74. The tillage blade 74 is longitudinally aligned with the front coulter disk 66 and follows in the groove 67 cut thereby.

Figure 2:
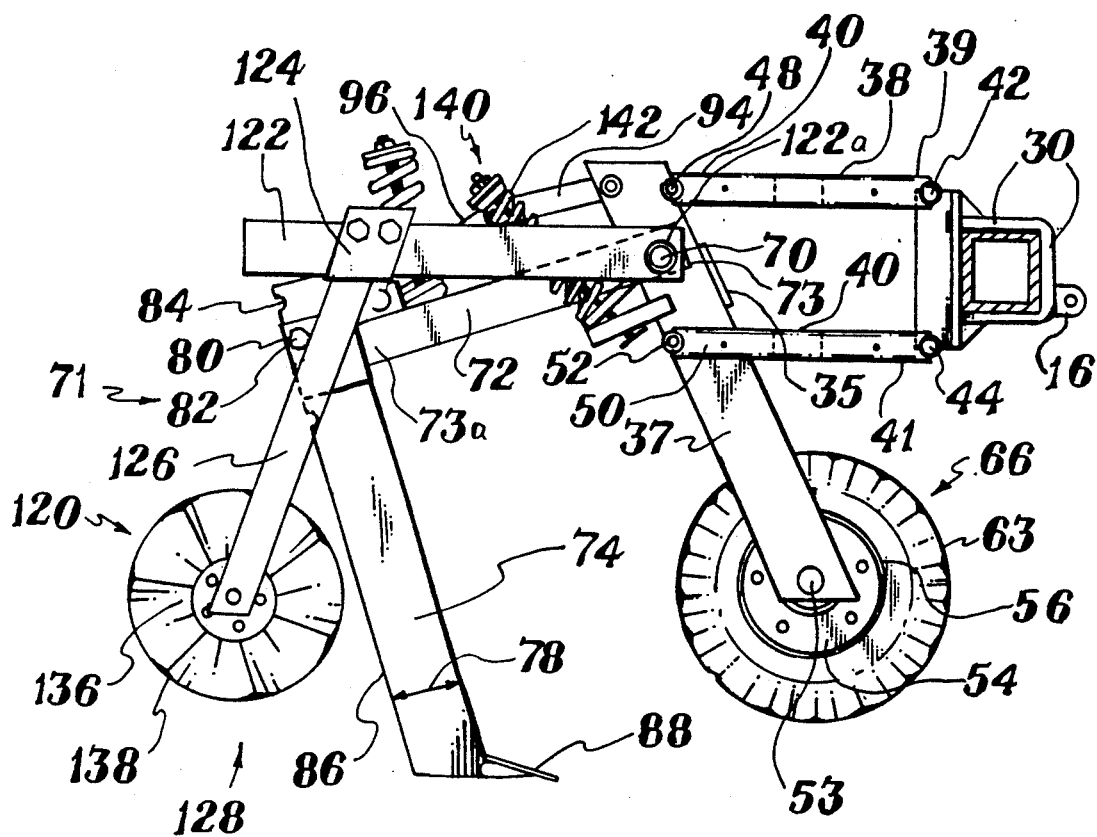
FIG. 2 is a sectional end view thereof, taken along the line 2—2 of FIG. 1, illustrating a tillage knife assembly in an intermediate tillage setting and soil crumbling coulters in a rearward deep tillage setting for purposes of clarity.

The tillage knife mounting bar 72 is coupled to the tillage blade 74 via a pair of side clamps 80 mounted on the rearward end of mounting bar 72 and detachably clamped to laterally opposite sides of the tillage blade 74 via bolts 82 which are received in any selected ones of a plurality of vertically spaced notches or slots 84 provided in the rear edge 86 of tillage blade 74. In FIGS. 2 and 5, the blade 74 is illustrated in the intermediate position. By merely loosening and removing the bolts 80, the tillage blade 74 can be vertically moved upwardly and downwardly relative to the mounting arm 72 and the frame 22 to any selected one of a plurality of different vertically spaced positions such as the raised or shallow position illustrated in FIG. 2A, the intermediate portion illustrated in FIG. 2B, or the deep positions illustrated in FIGS. 2C and 6.

Mounted on the lower end 88 of the tillage blade 74 is a thin, flat, transversely extending, soil lifting tillage knife or point 88 which is substantially wider than the thickness 76 of lifting blade 74. The tillage knife 88 is angled upwardly, rearwardly to lift a strip of over-lying soil 92 between the knife 88 and the surface 58 as the machine moves forwardly in the direction of the arrow X.

The soil lifting tillage knife or point 88, which is tilted downwardly forwardly, will draw the point 88 and blade 74 downwardly into the soil as the machine moves forwardly and the soil lifting point 88 engages the soil. The width 89 of the tillage knife or point 88 may, for purposes of example, be 1⅜" compared to the width 76 of the tillage blade 74 which might be ⅝ inch. This relatively thin shank slips through the soil without creating a large slot or soil disturbance. This feature minimizes the horsepower required to forwardly draw the machine.

Figure 6:
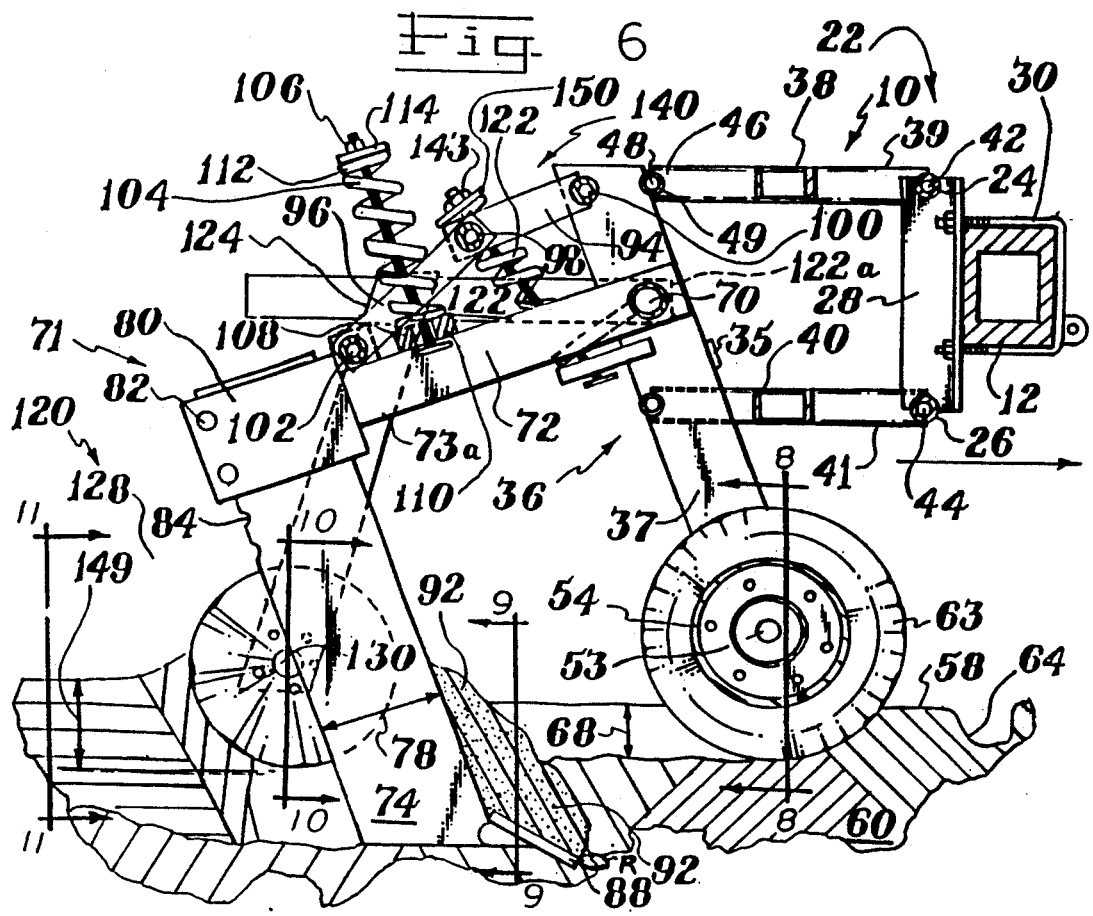
FIG. 6 is a sectional side view, taken along the line 6—6 of FIG. 1, illustrating the tillage knife assembly and soil crumbling coulters in a deep setting embedded in the earth raising a strip of surface soil which is crumbled and deposited in a longitudinal row of pulverized soil as the machine forwardly moves.
Figure 7:
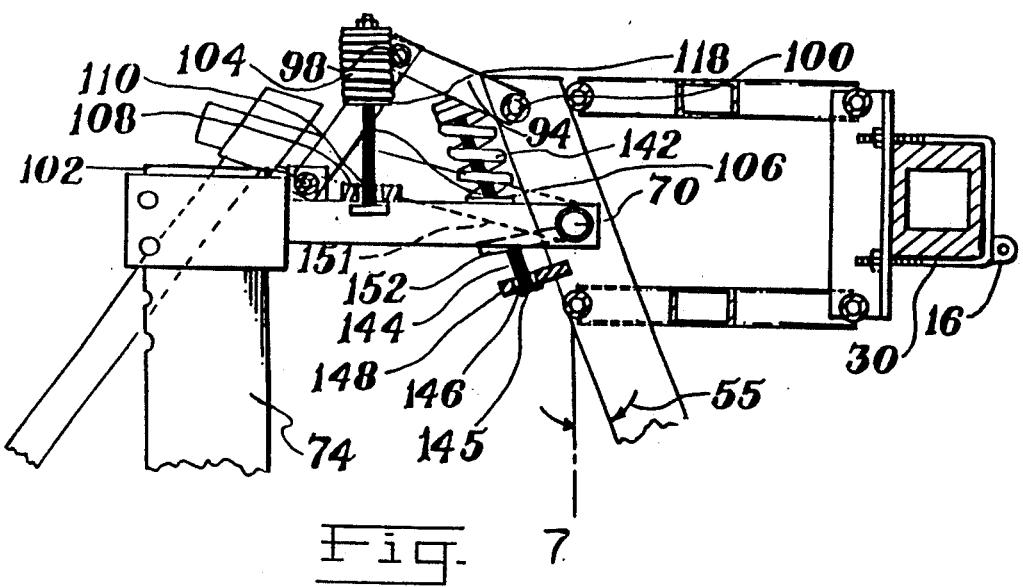
FIG. 7 is a sectional end view, similar to FIG. 6, illustrating the tillage knife assembly in a tripped, slightly elevated position.

The tillage blade 74 is normally releasably held in the forward, lowered operative position illustrated in FIG. 6 via yieldable reset biasing mechanism, generally designated 93, which allows the tillage blade 74 to vertically swing about the spindle 70 to a tripped position, illustrated in FIG. 7, if the lifting blade 88 inadvertently encounters an obstruction such as a rock R. In the forward position illustrated in FIG. 6, the blade 74 and chassis bars 37 are parallel and inclined at an angle of 20° to the vertical.

The tillage knife reset biasing mechanism 93 includes a pair of pivotally connected toggle link assemblies 94 and 96 pivotally coupled together via a pivot pin 98, for coupling the rear portion of tillage knife mounting arm 72 to the chassis 36. The front toggle link 94 is pivotally coupled to the chassis 36 via a pivot 100 and the rear toggle link 96 is coupled to the mounting arm 72 via a pivot 102. The biasing mechanism 93 includes a coil spring 104 for resiliently and yieldably holding the tillage knife 74 in the forward operative position illustrated in FIG. 6. The spring 104 is received by an upstanding bolt 106 which is loosely received in an aperture 108 provided in a plate 110 fixed to the tillage knife mounting arm 72. The upper end 112 of the spring 104 is contained via a plate or nut 114 threaded on the upper end of the rod or bolt 106. The lower end 114 of the spring is confined via a plate 118 fixed to the link 96. If the tillage knife encounters an underground obstruction, such as a rock R or the like, it will swing rearwardly against the biasing force of coil spring 104 to the raised inoperative position, illustrated in FIG. 7. The thus compressed spring 104 will return or reset the tillage knife to the operative position illustrated in FIG. 6 when the obstruction R passes or is otherwise removed.

Pivotally mounted on each side of the tillage assembly 71 is a soil crumbling and pulverizing coulter assembly, generally designated 120. The coulter assembly 120 includes a pivot bar 122 having a forward bushing 122a pivotally mounted on the spindle 70. Longitudinally adjustably mounted on the pivot bar 120 via a coupling bracket 124 is a depending coulter mounting arm 126 mounting a vertical coulter 128 via a shaft 130. The coulter 128 includes a central vertical planar portion 136 and a peripheral undulated, soil grinding and crumbling portion 138.

The coulter disks 128 lie in parallel vertical planes which are parallel to the plane of the tillage blade 74 and parallel to the plane of the front coulter disk 66.

Figure 3:
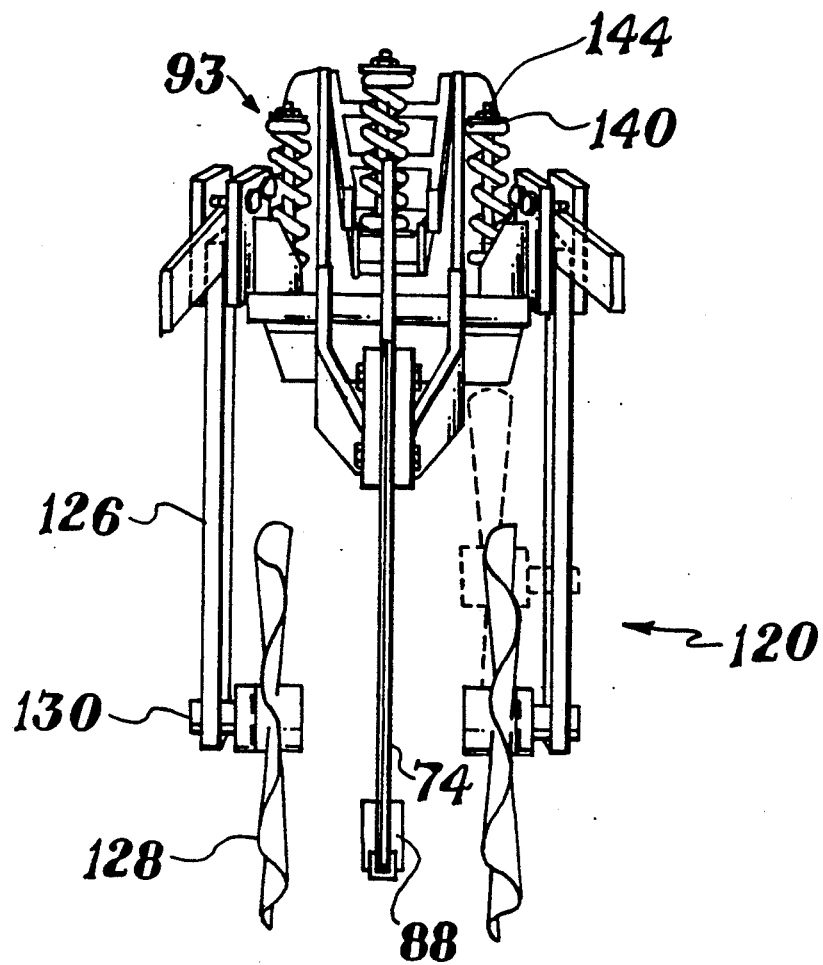
FIG. 3 is a rear perspective view thereof.

Each pivot arm 122 is independently yieldably urged downwardly, forwardly via a biasing assembly, generally designated 140, including a coil spring 142 received on a rod 144 which is freely received in an opening 146 provided in a plate 148 fixed to the chassis 36. The rod 144 includes an enlarged head 145 to preclude the head from moving upwardly through the opening 146. The upper end 143 of the spring is retained, via a plate or nut 150 threadedly mounted on the upper end of the rod 144. The lower end 151 of spring 142 is restricted via a plate 152 fixed to the coulter mounting pivot arm 122. The spring 142 will tend to keep the coulters 128 embedded in the soil, the forward positions illustrated in FIG. 6, but will allow each coulter disk 128 to move rearwardly upwardly relative to the other coulter disk to the raised postions as illustrated in chain lines in FIG. 3.

The coulter disks 128 are not vertically setable and will normally penetrate the soil to a depth 149 of 3½ to 4 inches. The coulter disks 128 are forwardly and rearwardly moveable on the pivot arms 122 between the rearward, intermediate, and forward positions in FIGS.

Figure 2A:
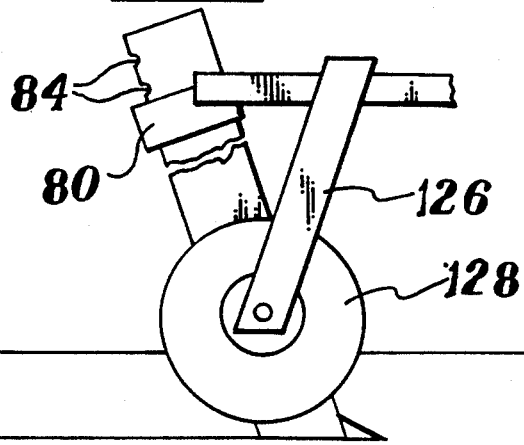
FIG. 2A is a fragmentary schematic sectional side view, similar to FIG. 2, but illustrating the relative positions of the tillage knife assembly and soil crumbling coulters in a shallow tillage setting.
Figure 2B:
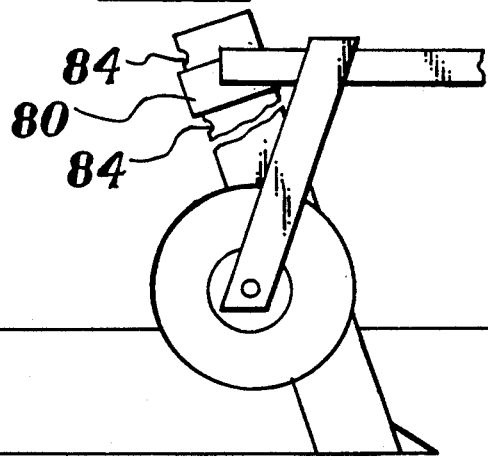
FIG. 2B is a similar fragmentary schematic sectional side view illustrating the tillage knife assembly and soil crumbling coulters in an intermediate setting.
Figure 2C:
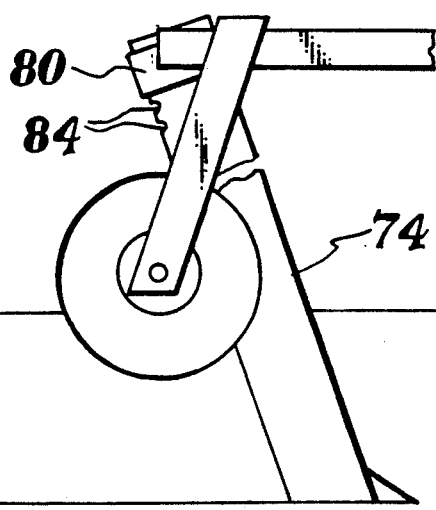
FIG. 2C is a similar fragmentary schematic sectional side view illustrating the relative positions of the tillage knife assembly soil crumbling coulters in a relatively deep tillage setting.

2B, 2 and 2A, respectively. The tillage blade 74 can be vertically adjusted via bolts 82 such that the tillage knives 88 will enter the earth to a selected depth which might typically be either 4, 6½ or 9 inches as illustrated in FIGS. 2A, 2B and 2C, respectively.

If desired, a fertilizer dispensing tube 164 may be mounted immediately rearwardly of the tillage blade 74.

THE OPERATION

The main frame bar 12 is coupled to a three point hook up on a tractor or the like (not shown) via the apertured coupling ears 16 and 18. The relative positions of the knife assembly 71 and soil crumbling coulter assemblies 120 on each gang assembly 20 are individually adjusted and set. The coulter disks 128 and coulter mounting arms 126 of each gang assembly 20 are selectively positioned, via coupling brackets 124, in the forward, intermediate and rear positions (FIGS. 2A, 2B and 2C, respectively) relative to the pivot bars 122, and the knife assembly 71 is concurrently positioned in the shallow (4 inch), intermediate (6½ inch), and deep (9½ inch) soil lifting setting, respectively. The machine is lowered to the field surface 58 via the hydraulically operated three point hook up and propelled forwardly by the draft tractor in the direction of the arrow X.

As the machine is moved forwardly, the downwardly inclined, soil lifting knife 88 will be drawn into the earth. As the machine moves forwardly, the front coulter disk 66 will forwardly rotate in the direction of the arrow 156 to sever the corn stalks 65 into two pieces, illustrated at 65a, and to cut a slot 67 in the surface soil or sod. The tillage blade 74 is longitudinally aligned with, and travels in, the slot 67. As the soil lifting knife or point 88 is moved forwardly, it will force the strip of surface soil 92 upwardly, as illustrated at 154 (FIG. 9) to loosen and partially break up the surface soil. The partially raised strip of partially broken-up surface soil will mound or crown on opposite sides of the above surface portion of the tillage blade 74. As the strip 154 of soil is initially moved upwardly, it will tend to raise or crown more at the middle 157 thereof than at the edges 159 thereof and thus the severed stalk pieces or residue 65a will tend to be propelled sidewisely in the direction of the arrow Z as the soil is lifted. The residue 65s, which is relatively lightweight in comparison to the soil being lifted, will tend to be laterally propelled off the soil strip 155.

As the machine moves forwardly, the front coulter wheel bands 56 will negotiate undulations 64 in the earth surface to raise and lower the chassis 36 and remaining parts mounted thereon to maintain the tillage depth relatively constant.

Since each gang assembly 20 is independent of the other, each chassis 36 can vertically move relative to the other chassis 36 to accommodate lateral undulations in the soil surface and maintain even tillage in laterally spaced rows which are at different elevations.

As the tillage knife initially raises the soil strip 154, the relatively lightweight residue 65a will be laterally propelled off the strip 160. The forward speed can be adjusted relative to the relative front-to-rear spacing and overlapping of coulter disks 128 and tillage blade 74 depending on factors such as soil condition, type of residue, etc.

Figure 11:
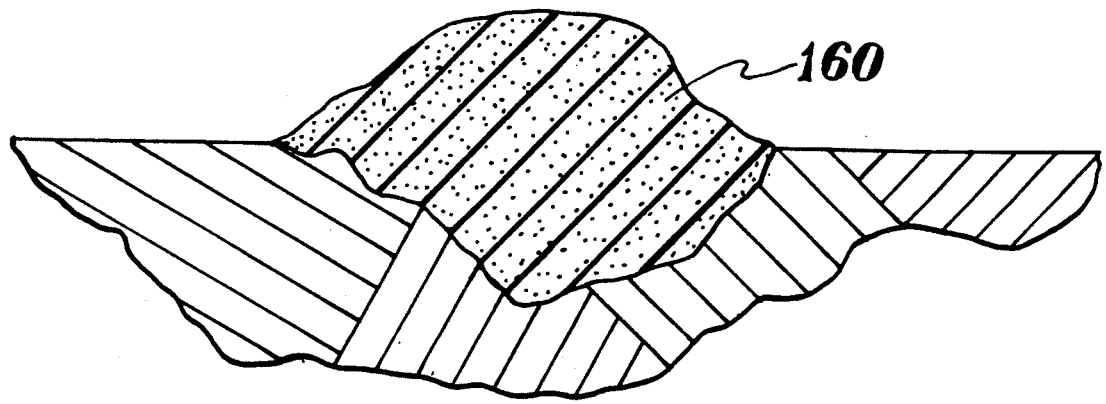
FIG. 11 is a sectional view, taken along the line 11—11 of FIG. 7, illustrating a prepared seed bed.

The soil strip 154 will continue to be raised in a rearward direction relative to the forwardly moving machine. The partially broken up soil strip 154 will be laterally shielded and sandwiched between the fluted coulter disks 128 and the side surfaces 74a of the tillage blade 74. As the machine moves forwardly, the coulter disks 128 will forwardly rotate in the direction of the arrow 158 to further reduce, break up, work, crumble, grind and/or pulverize the strip of surface soil into fine particles which are deposited in laterally spaced, longitudinal strip seed bed rows, generally designated 160 (FIG. 11), for receipt of seed.

If the tillage knife 88 impacts a rock R, the tillage blade 74 will swing upwardly, rearwardly to the inoperative position illustrated in FIG. 7 against the biasing force of coil spring 104 which will then be compressed. As soon as the rock clears, the coil spring 104 will force the tillage blade forwardly and automatically reset it to the forward operative position illustrated in FIG. 6.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

What we claim is:

1. Strip-till seed bed preparation apparatus for preparing longitudinal, laterally spaced apart parallel rows of surface soil in a residue laden field for the planting of seeds comprising:
    a main frame adapted to be coupled to a draft vehicle;
    a plurality of laterally spaced apart gang assemblies;
    each of said gang assemblies comprising;
        a chassis
        means mounting said chassis for swinging movement on said main frame;
        rotatable wheel means rotatably mounted on said chassis for supporting said chassis on the soil surface so that said chassis follows the contour of the soil being transversed as the chassis is forwardly moved by said draft vehicle and including
        disk means for cutting said soil surface to a predetermined depth below the surface of the soil;
    soil loosening means mounted on said chassis for movement therewith including soil lifting means receivable below the surface of said soil, said soil lifting means including
        blade means mounted on said chassis rearwardly of but in longitudinal alignment with, said disk means for movement on said chassis,
        said blade means having an above surface portion and a sub-surface portion for penetrating the soil to a depth greater than said predetermined depth below the surface of said soil;
        said soil lifting means being mounted on the lower end of said blade means for lifting and loosening a longitudinal strip of surface soil as said soil lifting means forwardly moves; and
    soil pulverizing means for working and crumbling the lifted soil to prepare a seed bed including
        a pair of rotatable, disk means on laterally opposite sides of said blade means in longitudinally overlapping relation with said blade means for laterally holding and sandwiching, the lifted soil between said above surface portion of said blade means and said rotatable disk means to pulverize said lifted soil;
        said rotatable wheel means including depth control means for controlling the depth of penetration of said blade means below said soil surface.

2. The apparatus set forth in claim 1 wherein said disc means and said blade means lie in planes which are parallel to each other.

3. The apparatus set forth in claim 1 including arm means adjustably mounting said blade means on said chassis for movement to any selected one of a plurality of different vertically spaced positions.

4. The apparatus set forth in claim 3 including toggle link means coupled between said chassis and said arm means and yieldable reset means reacting between said toggle link means and said arm means for normally holding said sub-surface portion to said greater predetermined depth but yieldable to allow upward movement of said blade means if said blade means inadvertently hits an obstruction, and resetting said sub-surface portion to said pre-determined depth when said obstruction is removed.

5. Strip-till seed bed preparation apparatus for preparing a plurality of laterally spaced apart, parallel, longitudinal rows of surface soil for the planting of seeds comprising;

a main frame adapted to be coupled to a draft vehicle for forwardly propelling said frame;

a chassis;

means for swingably mounting said chassis on said main frame for swinging movement on said main frame;

rotatable wheel means rotatably mounted on said chassis for supporting said chassis on the soil surface so that said chassis follows the contour of the soil being transversed as the chassis is forwardly moved by said draft vehicle including disk means for cutting the soil surface to a predetermined depth below said soil surface means for cutting and lifting compacted surface soil to loosen and break up said compacted surface soil including blade means mounted on said chassis and including an above surface blade portion rearwardly of but longitudinally aligned with, said disk means and a sub-surface blade portion for entering the soil to a predetermined depth below the soil surface and lifting a longitudinal strip of surface soil as said apparatus moves in a forward path of travel; and means for swingably mounting said blade means on said chassis for swinging movement between a forward, lowered, operative position and a rearward, raised, inoperative position;

soil pulverizing means for pulverizing the lifted soil comprising rotatable disk means mounted on said chassis in laterally spaced, longitudinally overlapping relation with said above surface blade portion to sandwich and grind said lifted soil between said disk means and said above surface blade portion;

toggle link means coupled between said blade means and said chassis;

reset means yieldably reacting between said blade means and said toggle link means for normally holding said blade means in said forward operative position but being yieldable to allow said blade means to rearwardly swing to said inoperative position if said blade means inadvertently strikes an obstruction;

said reset means including means operable to return said blade means to said operative position when said obstruction is removed;

said wheel means including depth control means for controlling the depth of penetration of said blade means below said soil surface.

6. The apparatus set forth in claim 5 wherein said toggle link means includes a first link coupled to said blade means for rotation about a first axis, a second link coupled to said frame for rotation about a second axis; said first and second links being pivotally mounted for relative movement about a third axis.

7. The apparatus set forth in claim 6 wherein said reset means includes coil spring means for returning said blade means to said operative position when said obstruction is removed.

8. The apparatus set forth in claim 5 wherein said above surface blade portion lies in a vertical plane and said disk means lies in a plane parallel to said plane of said above-surface blade portion.

9. Seed bed preparation apparatus for preparing longitudinal, parallel rows of surface soil for the reception of seed in a residue laden, compacted farm field comprising:

a frame adapted to be forwardly propelled in a longitudinal path of travel along the soil surface;

means on said frame for cutting and lifting longitudinal strips of compacted surface soil to loosen and break up said strips of compacted surface soil including a vertical tillage blade having a thin lateral thickness relative to a substantially greater longitudinal breadth and including a lower end blade portion for entering the soil to a predetermined depth below the soil surface;

a tillage knife mounted on said lower end blade portion for lifting said strip of surface soil as said apparatus is forwardly propelled;

soil crumbling means for crumbling the lifted soil and depositing it in longitudinal rows comprising rotatable disk means in laterally spaced, longitudinally overlapping relation with said blade for holding the lifted soil against said tillage blade and crumbling the lifted soil as said disk means rotates; and means mounting said disk means for rotation in a plane parallel to said vertical tillage blade.

10. The apparatus set forth in claim 9 wherein said rotatable disk means comprises a pair of vertical, parallel disks on laterally opposite sides of the plane of said blade tillage; said tillage blade having a uniform thickness in a vertical direction.

11. The apparatus set forth in claim 10 including means mounting said disk means for swinging movement on said frame; and yieldable means reacting between said frame and said disk means for downwardly urging said disk means but allowing said disk means to swing upwardly.

12. The apparatus set forth in claim 9 wherein said frame comprises a main frame and a sub-frame swingably mounted on said main frame;

said means for cutting and lifting including a coulter blade rotatable mounted on said sub-frame forwardly of, and in longitudinal alignment with, said vertical tillage blade;

said tillage blade being pivotally mounted on said sub-frame.

13. The apparatus set forth in claim 12 wherein said rotatable disk means is pivotally mounted on said sub-frame for swinging movement thereon.

14. Seed bed preparation apparatus for preparing one or more longitudinal rows of surface soil for planting of seeds comprising:
 a main frame adapted to be coupled to a draft vehicle for forward movement;
 a chassis;
 means for mounting said chassis on said frame for forward movement therewith and for vertical swinging movement thereon;
 wheel means, rotatably mounted on said chassis, supporting said chassis on the soil surface so that said chassis follows the contour of the soil surface being traversed as the chassis is longitudinally moved forwardly by said draft vehicle;
 soil cutting and lifting means mounted on said chassis for loosening and breaking up a longitudinal strip of compacted surface soil as said chassis is moved forwardly comprising
  blade means including
   an above surface, vertically disposed, blade portion and
   a sub-surface blade portion for entering the soil to a predetermined depth below the earth surface and lifting a strip of surface soil between said sub-surface blade position and said soil surface as said apparatus forwardly moves; and
  soil crumbling means mounted on said chassis for crumbling the lifted strip of soil comprising
   rotatable disk means mounted in laterally spaced, longitudinally overlapping relation with at least a part of said above surface blade portion to laterally inwardly contain and grind said lifted soil laterally adjacent said above surface blade portion to form a row of crumbled planting soil;
 said wheel means including means for controlling the depth of penetration of said sub-surface blade portion.

15. The apparatus set forth in claim 14 wherein said means mounting said chassis on said frame comprises a pair of parallel, vertically spaced mounting arms pivotally coupled to said chassis; said wheel means including an upstanding disc mounting an annular band for bearing on the soil surface.

16. The apparatus set forth in claim 15 wherein said soil cutting and lifting means includes amounting arm extending rearwardly of said chassis and including means adjustably mounting said above surface blade portion on said mounting arm for movement to any selected one of a plurality of different vertically spaced positions.

17. The apparatus set forth in claim 15 wherein said blade means is pivotally mounted on said chassis for relative vertical swinging movement thereon in the event said blade means inadvertently hits an obstruction, such as a rock or the like.

18. The apparatus set forth in claim 14 including yieldable reset means reacting between said chassis and said soil cutting and lifting means for releasably holding said sub-surface blade portion at said predetermined depth as said sub-surface blade portion passes through said soil but allowing said sub-surface blade portion to swing upwardly if said sub-surface portion inadvertently strikes an obstruction, such as a rock or the like.

19. The apparatus set forth in claim 18 including mounting arm means pivotally mounting said blade means on said chassis.

20. The apparatus set forth in claim 19 wherein said yieldable means comprises first and second pivotally coupled links which are pivotally coupled to said chassis and to said mounting arm means, and spring means reacting between said links and said mounting arm means.

21. The apparatus set forth in claim 20 including means adjustably mounting said blade means on said mounting arm means in any selected one of a plurality of different vertically spaced position relative thereto.

22. The apparatus set forth in claim 21 including arm means adjustably mounting said rotatable disk means on said chassis for movement to any selected one of a plurality of longitudinally spaced positions to adjust the degree of overlap between said disks and said above surface blade portion.

23. The apparatus set forth in claim 22 including yieldable means reacting between said chassis and said arm means for yieldably holding said disk means at a predetermined depth but allowing said disks, upon inadvertently hitting an obstruction, to move upwardly relative to said chassis.

24. The apparatus set forth in claim 14 wherein said above surface blade portion lies in a vertical plane and further including means mounting said disk means for rotation in a longitudinal vertical plane parallel to said plane of said above surface blade portion.

25. The apparatus set forth in claim 24 wherein said disk means comprises a pair of parallel disks on laterally opposite sides said plane of said above surface blade portion.

26. The apparatus set forth in claim 14 wherein said disk means comprises a pair of parallel disks disposed on laterally opposite sides of said above surface blade portion.

27. The apparatus set forth in claim 15 wherein said soil lifting means includes a thin, upstanding blade of uniform predetermined thickness having an above-surface portion and a below-surface portion; and a vertically inclined point mounted on said below-surface portion; said point having a thickness greater than said predetermined thickness.

28. Strip-till seed bed preparation apparatus for tilling laterally spaced, longitudinally extending rows of surface soil in a residue laden field for seeding comprising:
 a main frame adapted to be coupled to a draft vehicle for forward movement;
 a sub-frame swingably mounted on said main frame;
 ground engageable guide means on said sub-frame for guiding said sub-frame to follow the contour of the field being traversed;
 soil lifting knife means, mounted on said sub-frame for movement therewith and for movement relative thereto, for penetrating the soil and lifting and partially breaking up a strip of surface soil as said frame moves forwardly and laterally outwardly propel at least a portion of any surface residue lying on said strip; and
 soil pulverizing shield means, mounted on said sub-frame in laterally spaced relation with said soil lifting means for laterally shielding the raised strip of surface soil laterally adjacent a portion of said soil lifting means and inwardly contain and grind said raised strip against said soil lifting means to further break up and pulverize said strip of surface soil;

said ground engageable guide means including means for controlling the penetration of said soil lifting blade means into said soil.

29. The apparatus set forth in claim 28 wherein said shield means is mounted on said chassis for vertical movement independently of said soil lifting knife means.

30. The apparatus set forth in claim 29 wherein said soil pulverizing shield means comprises a pair of rotatable disks rotatably mounted on laterally opposite sides of said soil lifting knife means for abrading and pulverizing said portion of raised strip of soil adjacent said soil lifting knife means.

31. The apparatus set forth in claim 30 wherein said disks lie in parallel vertical planes.

32. The apparatus set forth in claim 28 including reset biasing means yieldably urging and holding said soil lifting means in a forward operative position but allowing rearward swinging movement thereof to an inoperative position if said soil lifting knife means inadvertently strikes a hardened obstruction, such as a rock or the like.

33. The apparatus set forth in claim 32 including toggle link means pivotally coupled to said chassis and to said soil lifting knife means.

34. The apparatus set forth in claim 33 including spring means reacting between said knife means and said toggle link means for yieldably urging said knife means to said forward position.

35. The apparatus set forth in claim 28 wherein said sub-frame includes a downwardly forwardly inclined bar mounting said ground engageable guide means; said upstanding blade being parallel to said inclined bar.

36. The apparatus set forth in claim 5 wherein said depth control means includes annular wheel band means mounted on said disk means for following the contour of the earth surface and controlling the depth of penetration of said blade means below said soil surface.

* * * * *